Dec. 31, 1946. D. S. WILLSON 2,413,670
COMPOUND MOTION FLUID DISTRIBUTION VALVE FOR WABBLER PLATE METERS
Filed Dec. 23, 1944 5 Sheets-Sheet 1
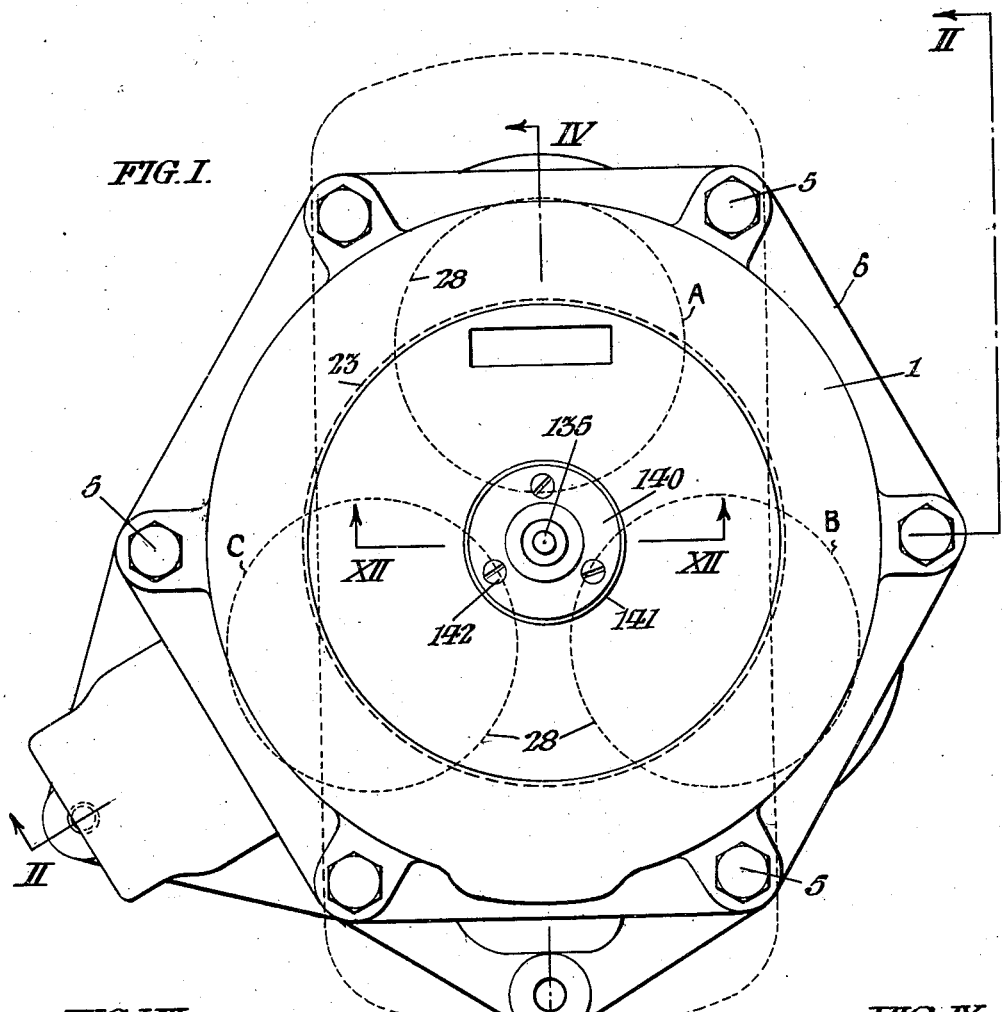
FIG. I.
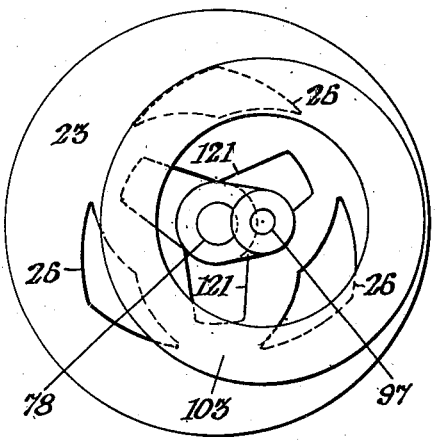
FIG. VIII.
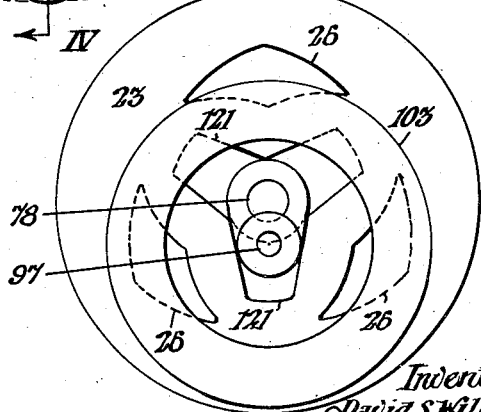
FIG. IX.
Inventor:
David S. Willson,
By [signature]
Attorney Dec. 31, 1946. D. S. WILLSON 2,413,670
COMPOUND MOTION FLUID DISTRIBUTION VALVE FOR WABBLER PLATE METERS
Filed Dec. 23, 1944 5 Sheets-Sheet 2
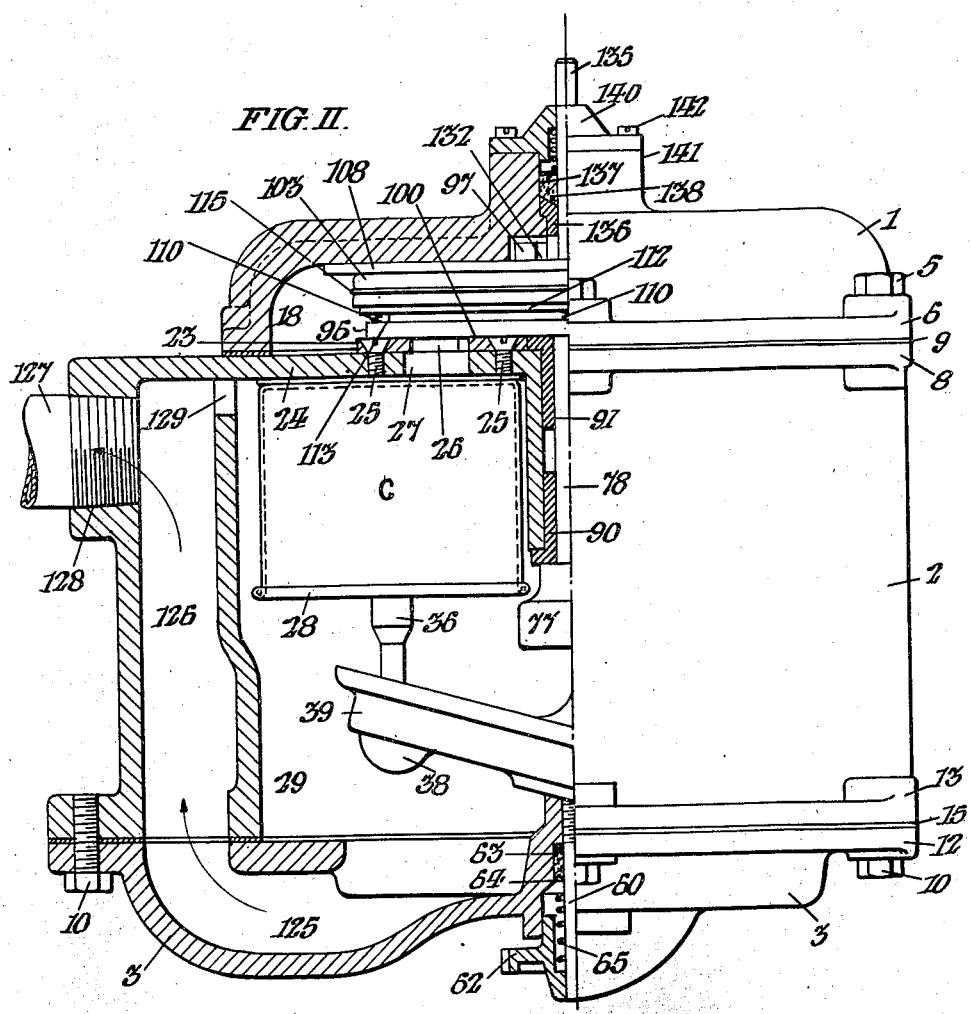
FIG. II.
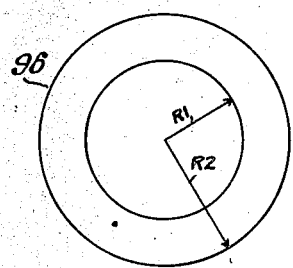
FIG. X.
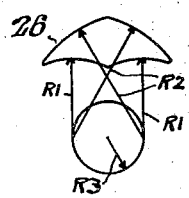
FIG. XI.
Inventor:
David S. Willson,
By Hans E. Paige
Attorney.

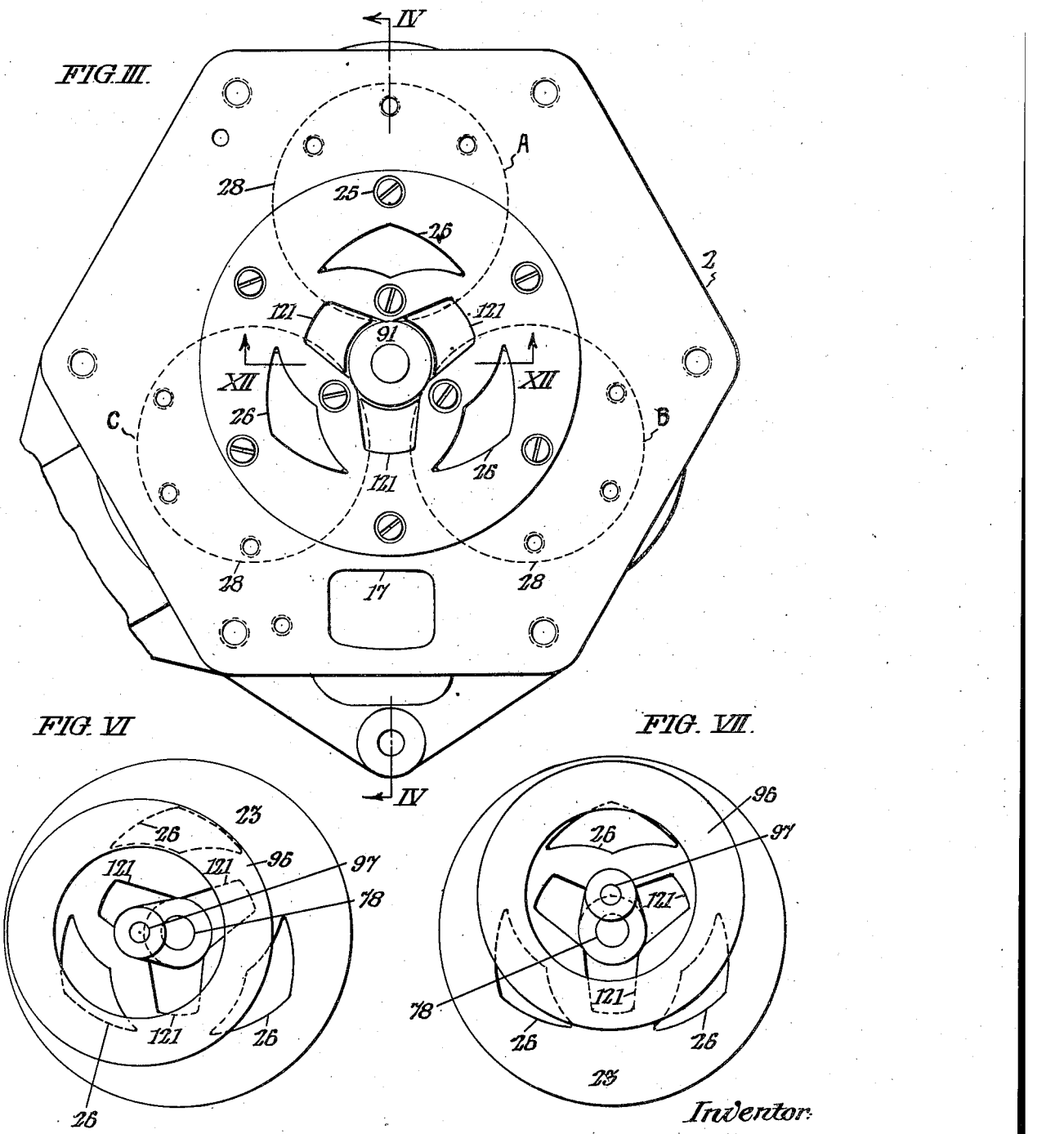

Dec. 31, 1946.  D. S. WILLSON  2,413,670
COMPOUND MOTION FLUID DISTRIBUTION VALVE FOR WABBLER PLATE METERS
Filed Dec. 23, 1944  5 Sheets-Sheet 4
FIG. IV.
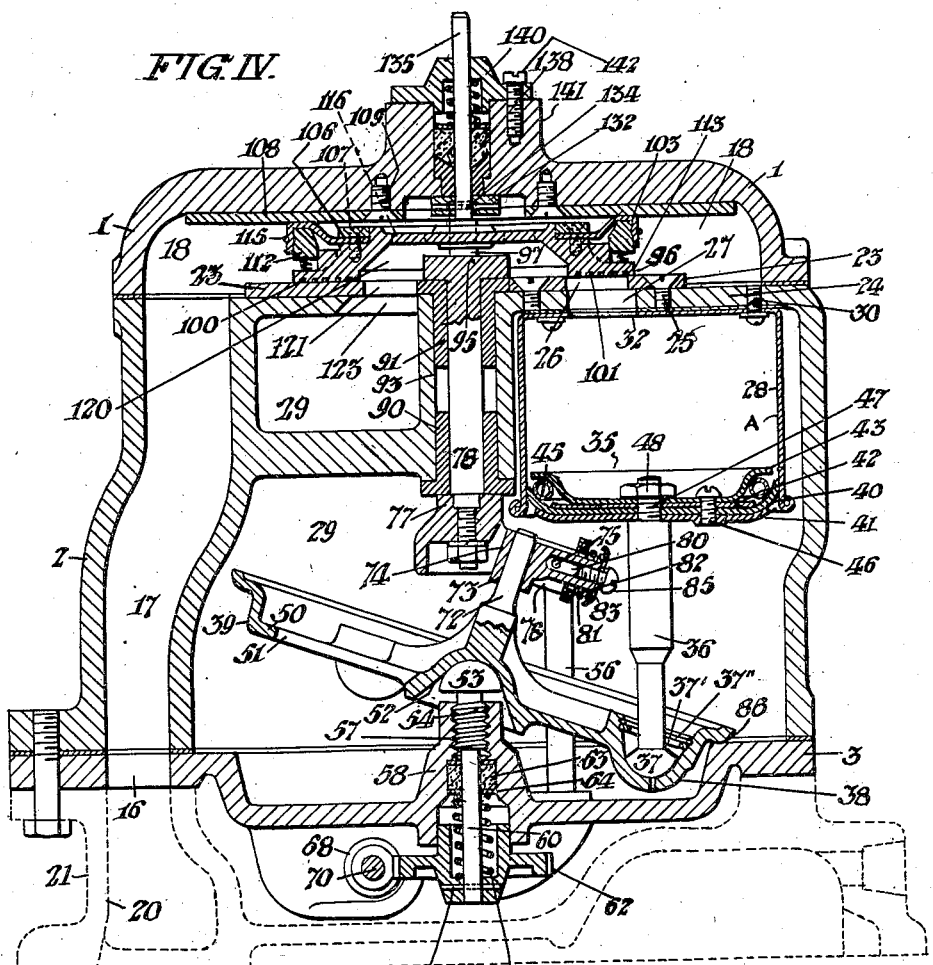
FIG. XII.
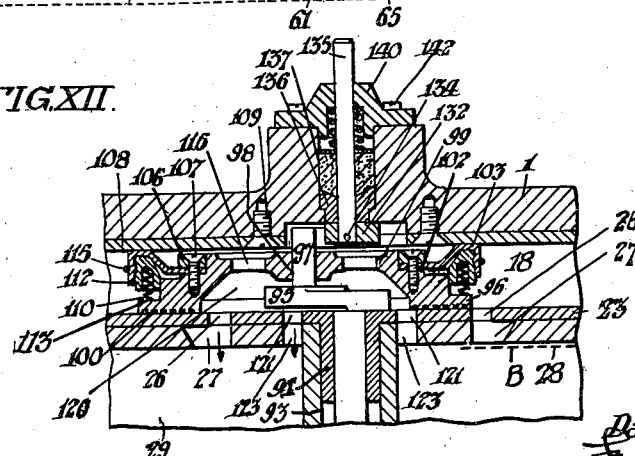
Inventor:
David S. Willson,
By [signature]
Attorney.

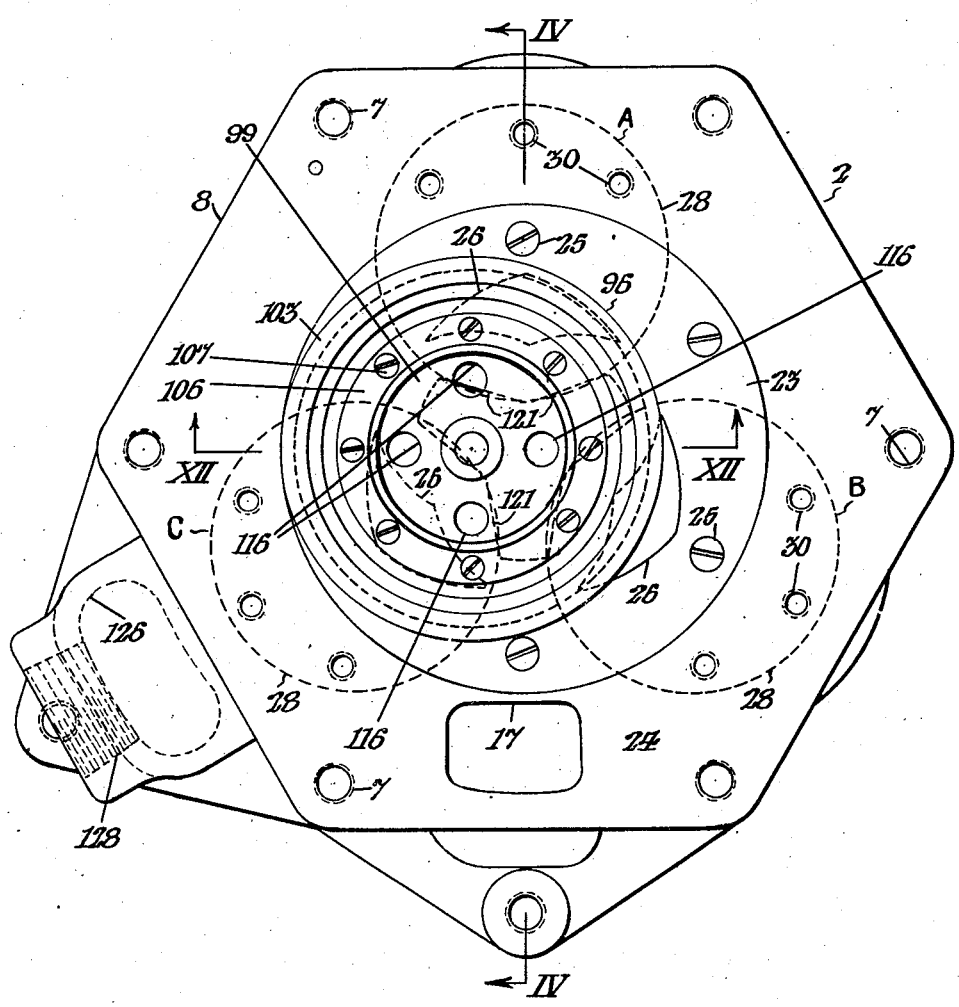

Patented Dec. 31, 1946

2,413,670

UNITED STATES PATENT OFFICE 2,413,670

COMPOUND MOTION FLUID DISTRIBUTION VALVE FOR WABBLER PLATE METERS

David S. Willson, Muskegon Heights, Mich., assignor to John Wood Manufacturing Company, Inc., Philadelphia, Pa., a corporation of Delaware Application December 23, 1944, Serial No. 569,477

4 Claims. (Cl. 121—119)

My invention relates to improvements in fluid meters of the positive displacement type which are particularly adaptable for use in dispensing apparatus which measures accurately the volume of fluid dispensed. My improved meter is also adaptable for other uses, such as for installation in a pipeline to measure accurately the volume of fluid flowing under pressure through the pipeline, etc.

My invention relates particularly to improvements in the valve means embodied in the meter.

One object of my invention is to provide a fluid meter which will operate with a minimum of energy consumption, resulting in a minimum of pressure drop and maximum accuracy.

Another object of my invention is to provide a meter valve in which there is but little hydraulic pressure on either of its valve seats.

Another object of my invention is to provide a meter valve in which no vertical load is imposed on the crank shaft which rotates the valve.

Another object of my invention is to provide a meter valve in which the contacting lip of the flexible valve cup leather is supported and retained in position by means of a ring encircling the valve cup leather.

Another feature of my invention is to provide a meter valve in which the flexible valve cup leather is stressed toward its seat by means of a series of springs interposed between the upper and lower faces of the valve.

My invention includes the various novel features of construction, arrangement, and method of operation hereinafter described.

In said drawings:

Fig. I is a top plan view of a meter embodying my invention.

Fig. II is a vertical sectional view, partly in elevation, taken on the lines II—II in Fig. I.

Fig. III is a plan view of the meter body shown in Fig. II, but with the top cover, valve, and top of the crank shaft not shown.

Fig. IV is a vertical sectional view of the structure shown in Fig. I, taken on the lines IV—IV in Figs. I, III and V.

Fig. V is a plan view, similar to Fig. III, but showing the meter valve in position on its valve seat.

Figs. VI, VII, VIII, and IX are schematic porting layouts showing in plan different positions of the valve with respect to the valve ports which are opened and closed by the valve. Fig. VII shows the valve moved 90 degrees clockwise from the position in which it is shown in Fig. VI. Fig. VIII shows the valve moved clockwise 90 degrees from the position in which it is shown in Fig. VII. Fig. IX shows the valve moved clockwise 90 degrees from the position in which it is shown in Fig. VIII.

Figs. X and XI are schematic views showing the relative radii of the meter valve and the ports controlled by said valve.

Fig. XII is a fragmentary vertical sectional view of the valve structure shown in Fig. IV, on a plane of section at right angles to the plane of section of Fig. IV, and taken on the lines XII—XII in Figs. I, III and V.

Referring to said drawings; the meter is conveniently formed in three parts comprising the top cover 1, main body casing 2 and base portion, or bottom closure, 3. Said top cover 1 is conveniently rigidly connected to the body casing 2 by means of a circumferential series of bolts 5 which extend through openings in the flange 6 of the top cover 1 into matching screw threaded holes 7 in the outer flange 8 of the body casing 2. I find it convenient to interpose the gasket 9 between the top cover 1 and body casing 2 in order to maintain said top 1 and body casing in fluid tight relationship. Said bottom closure 3 is conveniently rigidly connected to the body casing 2 by a circumferential series of bolts 10 which extend through openings in the flange 12 of the bottom closure 3 into matching screw threaded holes formed in the bottom flange 13 of the body casing 2. I find it convenient to interpose the gasket 15 between the bottom closure 3 and body casing 2 to maintain said bottom closure 3 and body casing 2 in fluid tight relationship.

Said bottom closure 3 is provided with the inlet opening 16 which is in registry with the inlet passageway 17 formed in the body casing 2. Said inlet passageway 17 is in open communication with the inlet chamber 18 formed in said top cover 1. Said meter is adapted to be mounted with the inlet opening 16 in registry with, or connected to, a source of fluid under pressure which is measured as it passes through the meter. For example, as shown in Fig. IV, I have shown my improved meter mounted on top of an air eliminator chamber, indicated in dotted lines, of a gasoline dispensing apparatus, and with the inlet opening 16 in registry with the outlet opening 20 in the top cover 21 of the air eliminator.

I find it convenient to form the valve seat 23 as a separate flat plate which is rigidly connected to the top wall 24 of the body casing 2 by means of a series of screws 25 which extend through drilled or punched openings in said valve plate 23 into engagement with matching screw threaded holes in said top wall 24. Said valve plate 23 is provided with the series of three port openings 26 therethrough which are in registry with openings 27 formed in the top wall 24 of the body casing 2. The openings 27 are larger than the accurately formed port openings 26 in the valve plate 23, and, accordingly, the effective port area is determined by the configuration and area of the accurately formed ports 26 in the valve plate 23. Each port 26 is in open communication with its piston cylinder 28. I find it convenient to form said piston cylinders 28 as pressed, or stamped, inverted steel cups which are rigidly secured to the underside of the top wall 24 of the chamber 29 of the body casing 2 by means of screws 30 which extend through punched or drilled openings in the top walls of the cups 28 into engagement with matching screw threaded holes formed in the top wall 24 of the chamber 29. The top wall of each cylinder cup 28 is provided with an opening 32 which is in registry with port opening 26 for that piston cylinder.

Although I have found it convenient to illustrate my invention with reference to a three cylinder type of meter, it is obvious that the number of piston cylinders used is optional, and although I have shown and described the piston cylinders 28 as being formed as separate cups attached to the top wall of the body casing, it is obvious that said cylinders may be formed either as an integral part of the body casing or formed in a cylinder block as a part of the body casing, such constructions being old and well known in the art.

As best shown in Fig. IV, each of the cylinders 28 is provided with a piston assembly 35 which is mounted in a cylinder 28 for reciprocation in response to the fluid pressure on top of the piston. In Fig. IV, for purposes of clarity, I have shown only the cylinder and piston assembly coming in the line of section. Each piston assembly 35 includes a connecting rod 36 provided at its lowermost end, as viewed in Fig. IV, with a ball end 37 which is mounted and confined in a socket 38 formed in the wabble plate 39. Each ball end 37 is conveniently retained in its socket 38 by means of a washer 37' and snap ring 37". Although I have shown the sockets 38 formed as an integral part of the wabble plate 39, it is obvious that said sockets may be formed as separate stampings inserted into openings formed in said wabble plate, as is well known in the art. Each piston assembly 35 includes a cup leather 40, piston backing plate 41, intermediate plate 42, piston spring retainer plate 43, and piston expander spring 45. The piston spring retainer plate 43, intermediate plate 42, cup leather 40, piston expander spring 45 and piston backing plate 41 are assembled together by means of a series of screws 46, one of which is shown in Fig. IV, which extend through matching openings formed in said piston spring retainer plate 43, intermediate plate 42, cup leather 40 into matching screw threaded holes formed in said piston backing plate 41. Each piston assembly 35 is mounted on the screw threaded reduced portion 47 of the piston rod 36 and maintained in rigid position on the piston rod 36 by means of a nut 48. The piston assembly shown and described is of a well known construction wherein the piston expander spring 45 is adapted to maintain the upturned edge of the cup leather 40 in continuous frictional engagement with the side wall of the cylinder 28.

I find it convenient to form the web 50 of the wabble plate 39 as a spider, including a series of openings 51 in spaced relation to the series of sockets 38 which are formed in enlarged portions in the spider arms of said wabble plate 39. Said openings 51 are formed in the wabble plate merely to lessen the weight thereof. The wabble plate 39 is provided with the socket 52 and said wabble plate 39 is concentrically mounted in the chamber 29 on the hemispherically-shaped ball end 53 of the adjusting screw 54. Rotation of the wabble plate 39 is prevented by the pin 56, rigidly mounted in a boss formed in the bottom closure 3, which extends through an elliptically-shaped opening formed in the web 50 of the wabble plate 39. The use of an elliptically-shaped opening and pin extending therethrough to permit nutation of the wabble plate, but to prevent rotation thereof, is well known in the art. The adjusting screw 54 is in screw threaded relationship with the screw threaded opening 57 of the boss 58 formed in said bottom closure 3. Said adjusting screw 54 has the reduced stem portion 60 which has rigidly connected thereto at its lower end, by means of the pin 61, the worm gear 62. The reduced stem portion 60 is provided with the packing 63 and packing ring 64. Said packing 63 and packing ring 64 are retained in position by the spring 65, the upper end of which engages the ring 64 and the lower end of said spring 65 is in engagement with the bottom of the socket formed in the hub of said worm gear 62. Said worm gear 62 is in engagement with the worm 68 which is rigidly mounted on the worm shaft 70. Said worm shaft 70 is provided at its outer end, not shown, with a screw driver slot for conveniently effecting adjusting movement of said worm and worm gear. Calibrating adjustment of the meter may be effected by inserting a screw driver in the slot in the end of the worm shaft 70 to turn the worm 68 to effect either clockwise or counterclockwise movement of the worm gear 62, to raise or lower the round-headed adjusting screw 54 and wabble plate 39 in engagement therewith, to thus shorten or lengthen the stroke of the piston assemblies 35 in their respective cylinders 28.

As best shown in Fig. IV, the wabble plate 39 is provided with the drive stem shaft 72 which is journalled in the drilled opening 73 formed in the driving block 74 of the crank arm driving block assembly. Said driving block 74 is mounted with freedom of pivotal movement on the pin 75, the opposite ends of which are held respectively in the bifurcated crank arms 76 (only one of which is shown in Fig. IV) formed on the crank 77 rigidly connected to the lower end of the crank shaft 78. Said pin 75 extends through an elongated opening 80 formed in said driving block 74, and, accordingly, said driving block 74 is thus mounted with freedom of both pivotal and reciprocatory movement in its sliding engagement within the bifurcated crank arms 76 of the crank 77 connected to the crank shaft 78. Reciprocatory movement of the driving block 74 in the bifurcated crank arms 76 is limited by the pin 75 coming into engagement with either end of the elongated opening 80 of the driving block 74. The driving block 74 is provided with the spring 81 held between the inner cup washer 82, in engagement with the ends of the bifurcated crank arms 76, and the outer cup washer 83 which is rigidly mounted on the right-hand end of the driving block 74 by means of the screw 85. Such driving block assembly places a loading on the stem shaft 72 substantially at right angles to the axis of said wabble plate stem shaft 72, with the result that all of the forces of the spring 81 act to hold the wabble plate 39 on the wabble plate track 86 formed on the upper side of the bottom closure 3, as viewed in Fig. IV. The crank arm and driving block assembly herein disclosed is described and claimed in my copending application Serial No. 601,180, filed June 23, 1945.

The crank arm 77 is rigidly connected to the reduced screw threaded lower end portion of the crank shaft 78 by means of a nut and lock washer. Said crank shaft 78 is journalled in the thrust bearings 90 and 91 which are press fitted in the opening formed in the bearing 93 which is formed conveniently as an integral part of the main body casing 2. As shown in Fig. XII, said crank shaft 78 is provided at its upper end, in integral relation therewith, with the crank arm 95 which drives the meter valve 96. The crank shaft 78 rotates in a clockwise direction, as viewed in Figs. I, III and V. The crank arm 77, at the lower end of the crank shaft 78, preferably is fastened to said crank shaft 78 at 90° clockwise from the crank pin 97 which drives the meter valve 96.

Said crank arm 95 is provided with the crank pin 97 which is journalled in the bearing 98 formed in the top integral web 99 of the valve 96. As best shown in Figs. IV and V, the valve 96 is circular and has the face 100 thereof in sliding engagement with the valve seat 23 to open and close the port openings 26. Conveniently, the valve face 100 is provided with a reticulated series of rectangular indentations 101 which decreases the surface area of the valve face 100 in sliding contact with the valve seat 23.

The top of the valve 96 is provided with an annular shoulder 102 on which is mounted the flexible valve cup leather 103. Said cup leather 103 is maintained in fluid tight relationship on the annular shoulder 102 by means of the clamping ring 106 which is rigidly clamped to said valve 96 by means of a circular series of screws 107 which extend through matching openings in said ring 106 and cup leather 103 into matching screw threaded holes formed in said annular shoulder 102. The upper valve plate 108, located in the inlet chamber 19, is rigidly connected to the underside of the top cover 1 by means of a series of screws 109 two of which are shown in Fig. IV, which extend through openings in said upper valve plate 108 into matching screw threaded holes formed in the underside of the top cover 1. As shown in Fig. XII, the outer upper surface of said flexible valve cup leather 103 is maintained in sliding fluid tight relationship with the upper valve plate 108 by means of a series of springs 110 which are engaged at their upper ends in sockets formed in the cup leather retaining ring 112. The lower end of said springs 110 bear upon the annular shoulder 113 formed at the lower outer edge of the valve 96. Although in Fig. XII, I have shown only the two springs 110 which come in the plane of section, I find it convenient to utilize four such springs 110 positioned 90° apart. Said flexible valve cup leather 103 is clamped to the valve retainer ring 112 by means of the clamping wire 115 which encircles the outer downwardly turned flange of the cup leather 103 and pinches said cup leather 103 into an annular groove formed in the outer circumference of the retainer ring 112.

The web 99, forming the top of the valve 96, is provided with a series of openings 116 therethrough to permit fluid to pass freely from the underside of said web 99 to the top surface of the valve 96. I find it convenient to form four such openings 116 located 90° apart through said web 99, although in Fig. XII there are shown only the two openings 116 which come in the plane of section.

The chamber 120, formed in the valve 96, is in continuous open communication with the chamber 29 through the outlet ports 121 formed in the valve plate 23. Said outlet port openings 121 are in registry with openings 123 formed in the top wall 24 of the body casing 2. The openings 123 are larger than the accurately formed outlet port opening 121 in the valve plate 23, and, accordingly, the effective outlet port area is determined by the configuration and area of the accurately formed outlet ports 121 in the valve plate 23. Each outlet port opening 121 is in open communication with the chamber 29 of the body casing 2.

As best shown in Fig. II, said chamber 29 is in open communication with the outlet passageway 125 formed in the bottom closure 3. Said outlet passageway 125 is in open communication with the outlet passageway 126 formed in the body casing 2, and the outlet pipe 127 is connected to the screw threaded opening 128 formed in the top of the outlet passageway 126. The outlet passageway 126 is in restricted open communication with the chamber 29 through the communicating passageway 129 formed in the top wall of the chamber 29, as best shown in Fig. II. Communication between the top of said outlet passageway 126 and the chamber 29 is desirable to carry off any air with the returned liquid, so as to displace quickly all of the air in the meter body when it is placed into service. If it were not for such communication between the outlet passageway 126 and the chamber 29, a certain amount of air would be entrapped between the cylinder cups 28 and the body casing 2 for a considerable period of time before such air would be absorbed by the liquid. Entrapment of air would be objectionable because of the alternate compression and expansion of such air during operation of the meter, depending upon the time elapsing between the closing of the dispensing nozzle valve in consecutive deliveries, and such alternate compression and reexpansion of air would result in variations in the recorded delivery of the meter.

As best shown in Fig. XII, the upper part of the pin 97 also acts as the driving pin for the drive shaft arm 132 which is rigidly fastened by means of the pin 134 to the lower end of the drive shaft 135. Said drive shaft 135 is adapted to be connected at its upper end, by any convenient means, to a recording mechanism which registers the volume of fluid passed by the meter. Said drive shaft 135 is journalled in the bearing 136 in the cylindrical opening 137 formed in the top cover 1. I find it convenient to provide said drive shaft 135 with the spring-loaded stuffing box 138, which may be of any of the well known constructions. The upper end of said shaft 135 is journalled in the closure cap 140 which is rigidly connected to the boss 141, formed at the top of the top cover 1, by means of a series of screws 142.

In Figs. X and XI, I have indicated schematically the theoretical method of describing, or generating, the valve plate ports 26 with only one port shown for convenience. Referring to Fig. X, R1 is the inner radius of the valve face 100 and such radius R1 is used to generate the inner sides of the valve ports 26. The outer radius R2 of the valve face 100 is used to generate the outer lines of the port 26. These are generated from the two points, as illustrated in Fig. XI, on the circle of the axis of the crank pin 97 of the crank shaft 78, which circle has a radius of R3. However, in actual practice the meter valve should have a slight seal on a port when the valve reaches a position in its rotation to close that port. Accordingly, in actual commercial manufacture, the radius R1 of the valve face 100 is made slightly less than the radius R1 of the port 26 by approximately 0.010 inch; and the radius R2 of the valve face 100 is made greater than the radius R2 of the port 26 by a corresponding amount. This is best indicated in the schematic views, Figs. VI and VIII, in which a port 26 is shown completely closed by the valve face 100 of the valve 96.

*Operation*

For purposes of clarity in the description of the operation of my improved meter, I have identified each of the three cylinders 28 with identifying symbols A, B, C, as indicated in Figs. I, II, III, IV, and V. I also have indicated the plane of section of Fig. IV in Fig. V, and the plane of section of Fig. XII in Figs. III and V.

It should be noted that in Fig. IV, the crank arm 95 and crank pin 97 are directly away from the observer, and that the valve face 100 of the valve 96 completely overlaps the port 26 leading to the cylinder 28 identified by A in Fig. IV, and also identified as A in Figs. I, III and V.

Assuming the meter to be completely filled with liquid as installed in a conventional type of gasoline pump, such as is disclosed in Letters Patent of the United States No. 2,351,331 granted June 13, 1944, to M. J. Goldberg, the meter inlet opening 16 is connected to the outlet opening 20 in the top cover 21 of an air eliminator. With liquid being dispensed through the meter, the liquid under pressure flows up the inlet passageway 17 to the inlet chamber 18 formed in the top cover 1. With the meter valve 96 in the position shown in Figs. IV, V and XII, and as schematically indicated in Fig. VI, said valve 96 has completely covered and closed off the port 26 leading to the cylinder 28 identified by A. As is best shown in Fig. V, the port 26 leading to the cylinder 28 identified as B would be in open communication to receive liquid under pressure from the chamber 18. The port 26 leading to the cylinder 28 identified by C is within the chamber 120 and, hence, fluid within the cylinder C is in the process of being discharged from said cylinder C upwardly through the port opening 26 from said cylinder C and through the outlet ports 121 to the outlet chamber 29 of the body casing 2. The liquid under pressure from the chamber 18 entering through the port 26 to cylinder B would force the piston assembly 35 in said cylinder B downwardly. Such downward movement would move the wabble plate 39, thus causing the crank shaft 78 to revolve clockwise, as viewed in Fig. V. Clockwise movement of the crank shaft 78 moves the valve 96 clockwise, and if such movement were limited to 90° of one rotation, the valve 96 would be moved from the position shown schematically in Fig. VI to the position shown schematically in Fig. VII. With the valve moved to the position shown in Fig. VII, the port 26 for cylinder A would be in communication with the outlet ports 121, and the piston assembly in cylinder A would deliver liquid on its upward stroke to the chamber 120 and thence through the outlet ports 121. With the valve 96 in the position shown schematically in Fig. VII, the ports 26 leading to cylinders B and C are partially open to chamber 18.

Assuming that the operation of the meter has moved the valve 96 further 90° clockwise and from the position shown in Fig. VII to the position shown in Fig. VIII, the port 26 leading to cylinder A is completely closed and the port 26 of cylinder B is in communication with the chamber 120 and outlet ports 121. In this position the port 26 of the cylinder C has been opened in wider communication with the chamber 18. Assuming that the meter valve 96 has been rotated 90° further in a clockwise direction, or from the position shown in Fig. VIII to the position shown in Fig. IX, the port 26 leading to and from the cylinder A is open to the chamber 18. The respective ports 26 of cylinders B and C are closed to chamber 18, but are in open communication with chamber 120 to discharge liquid through the ports 121 into the outlet chamber 29 formed in the meter body 2.

As the meter operates, liquid is forced downwardly in the chamber 29 and out through the passageway 125, formed in the bottom closure 3, and thence through the outlet passageway 126 to the outlet pipe 127 which, in a liquid dispensing apparatus, is connected to the valve-controlled dispensing nozzle of such apparatus.

It is to be noted that since the meter shown and described herein has three pistons, and because each piston is driven for 180° of rotation of the crank shaft, the meter construction shown could not stop on a so-called dead center, as would be possible in a two-cylinder single acting structure.

It is obvious from the description herein of the construction of my improved meter valve 96, that there is but little hydraulic pressure on either the valve seat 23 or valve seat 108 with which the valve face 100 and cup leather 103, respectively, of the valve 96 are in sliding engagement. Also, that my meter valve imposes no vertical load on its crank shaft. In my improved structure, the fluid pressure imposed on the top surface of the valve 96 is the same as the fluid pressure in the chamber 120 formed in the lower part of the valve 96, because fluid under pressure passes from the underside to the upper side of the valve 96 through the series of openings 116 provided in the web 99 of the valve 96. Also, with my improved meter valve 96, the lip of the valve cup leather in contact with the valve plate 108 is continuously supported and retained in position by means of the supporting retainer ring 112, clamping wire 115, and the series of springs 110 interposed between the ring 112 and the annular meter valve shoulder 113.

It is obvious that various modifications may be made in my invention without departing from the essential features thereof as defined in the appended claims, and, therefore, I do not desire to limit myself to the precise details of construction, arrangement, or method of operation herein set forth.

I claim:

1. In a valve for a fluid meter which includes a series of cylinders, a valve seat having a port opening for each cylinder, an upper valve plate, pistons mounted for reciprocation in said cylinders in response to fluid under pressure flowing through said port openings, and means connected to said reciprocating pistons arranged to convert the reciprocatory movement of said pistons into rotary movement for moving said valve across said port openings; the combination of a ring member having an imperforate valve face adapted for sliding engagement with said valve seat to open and close said port openings; a web portion formed in said ring member forming an inner recess in the lower portion of said ring member; a passageway through said web portion; a valve cup leather carried by the upper part of said ring member; a retainer ring for retaining and supporting said cup leather; and means to maintain said valve cup leather in engagement with said upper valve plate; whereby, flow of fluid around the top of said valve is prevented.

2. In a valve for a fluid meter which includes a series of cylinders, a valve seat having a port opening for each cylinder, an upper valve plate, pistons mounted for reciprocation in said cylinders in response to fluid under pressure flowing through said port openings, and means connected to said reciprocating pistons arranged to convert the reciprocatory movement of said pistons into rotary movement for moving said valve across said port openings; the combination of a ring member having an imperforate valve face adapted for sliding engagement with said valve seat to open and close said port openings; a web portion formed in said ring member forming an inner recess in the lower portion of said ring member; a passageway through said web portion; a valve cup leather carried by the upper part of said ring member; a retainer ring for retaining and supporting said cup leather; and spring means to maintain said valve cup leather in engagement with said upper valve plate; whereby, flow of fluid around the top of said valve is prevented.

3. In a valve for a fluid meter which includes a series of cylinders, a valve seat having a port opening for each cylinder, an upper valve plate, pistons mounted for reciprocation in said cylinders in response to fluid under pressure flowing through said port openings, and means connected to said reciprocating pistons arranged to convert the reciprocatory movement of said pistons into rotary movement for moving said valve across said port openings; the combination of a ring member having an imperforate valve face adapted for sliding engagement with said valve seat to open and close said port openings; a web portion formed in said ring member forming an inner recess in the lower portion of said ring member; a passageway through said web portion; a cup leather carried by the upper part of said ring member; a retainer ring for retaining and supporting said cup leather; means maintaining said cup leather in tight peripheral engagement with said retainer ring; and means to maintain said cup leather in engagement with said upper valve plate; whereby, flow of fluid around the top of said valve is prevented.

4. In a valve for a fluid meter which includes a series of cylinders, a valve seat having a port opening for each cylinder, an upper valve plate, pistons mounted for reciprocation in said cylinders in response to fluid under pressure flowing through said port openings, and means connected to said reciprocating pistons arranged to convert the reciprocatory movement of said pistons into rotary movement for moving said valve across said port openings; the combination of a ring member having an imperforate valve face adapted for sliding engagement with said valve seat to open and close said port openings; a web portion formed in said ring member forming an inner recess in the lower portion of said ring member; a passageway through said web portion; a cup leather carried by the upper part of said ring member; a retainer ring for retaining and supporting said cup leather; means maintaining said cup leather in tight peripheral engagement with said retainer ring; and spring means interposed between said ring member and said retainer ring to maintain said cup leather in engagement with said upper valve plate; whereby, flow of fluid around the top of said valve is prevented.

DAVID S. WILLSON.